June 19, 1956  J. W. GRAY  2,751,494
CONTROL CIRCUIT
Filed March 18, 1946

INVENTOR
JOHN W. GRAY

BY *[signature]*

ATTORNEY

United States Patent Office 2,751,494
Patented June 19, 1956

2,751,494

CONTROL CIRCUIT

John W. Gray, Cambridge, Mass., assignor, by mesne assignments, to the United States of America as represented by the Secretary of the Navy Application March 18, 1946, Serial No. 655,309

2 Claims. (Cl. 250—27)

This invention relates to electrical apparatus and more particularly to a trajectory extrapolation circuit for use in conjunction with a radar homing bomb steering device.

The homing bomb steering device described in copending application of Britton Chance and David T. Griggs, dated January 18, 1945, Serial Number 574,438, becomes inoperative at a range of approximately 1000 yards. If the pursuit course is curved due to target speed or wind at the time the steering device becomes inoperative, the missile will continue to fly a straight tangent course for the last 1000 yards and may miss to the rear or to the leeward of the target depending on the factor acting upon it. To make the radar homing bomb more effective it is desirable to provide some method of controlling it for this relatively short distance.

The primary object of the present invention is to improve the effectiveness of a radar homing bomb.

Another object of the present invention is to provide a simple method of controlling the course of a radar homing bomb during the last 1000 yards of its travel.

A still further object of the present invention is to provide a method for extrapolating the trajectory of a radar homing bomb in the desired manner.

Figure 1:
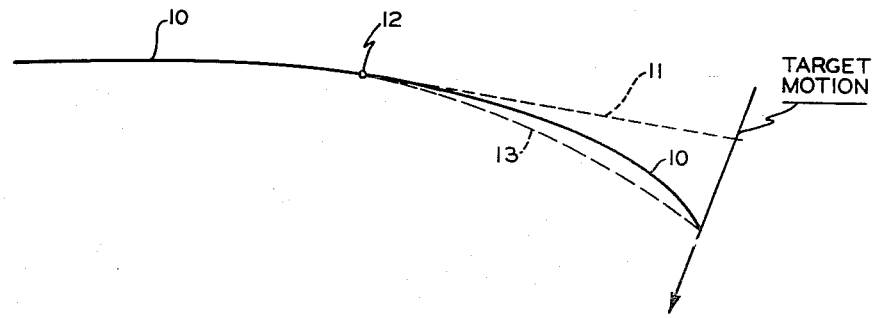
Figure 2:
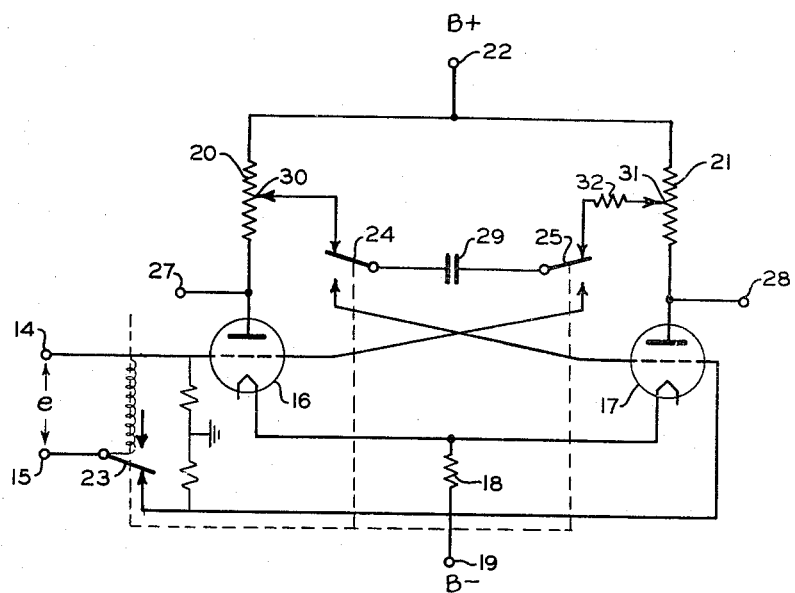

The foregoing and other objects will be apparent from the following specification when taken with the accompanying drawings in which:

Fig. 1 shows the path of the missile and explains the need of a controlling device; and Fig. 2 is a schematic diagram of the trajectory extrapolation circuit.

Referring to Fig. 1, curve 10 shows the pursuit course the missile should take if the steering mechanism of the radar homing bomb were effective until the time of striking the target. Curve 11 shows the tangent course the missile will take if a steering method is not provided after the radar homing bomb steering device becomes inoperative at point 12.

It can be shown that if the missile is so controlled as to have a constant curvature of twice that at point 12, where the steering device becomes inoperative, it will intercept the target at the same point as if the missile were steered along the pursuit course, a curve of ever changing curvature. The desired constant curvature course is shown in curve 13.

The control circuit employed to maintain a course of constant curvature is shown in Fig. 2. The error signal $e$ from the radar tracking device is applied at terminals 14 and 15 of a differential amplifier. This amplifier is of the same type as that used in the radar homing bomb, as disclosed in Fig. 4 of said copending application, Serial No. 574,438, consisting of triodes 16 and 17 whose cathodes are connected through common cathode resistance 18 to a source of negative voltage applied at terminal 19, and whose plates are connected through individual load resistances 20 and 21 to a common source of positive voltage applied at terminal 22. Relay contacts 23, 24 and 25 are normally closed as shown in the drawing. The amplified differential outputs at terminals 26 and 27 control the position of the rudder in a manner that the turn rate of the bomb is proportional to this output.

Relay contacts 23, 24 and 25 are made to operate at the point where the tracking device of the radar homing bomb becomes inoperative, thus putting condenser 29 between the grids of electron tubes 16 and 17. The location of taps 30 and 31 on plate resistors 20 and 21 is such that condenser 29 is charged to twice the value of the error voltage $e$. Therefore, when condenser 29 is put between the control grids of electron tubes 16 and 17, the differential output and hence the rate of turn is twice what it was just prior to the operation of the relay contacts. The grid current is so small that condenser 29 holds this charge for a sufficient time to cause the missile to maintain constant curvature until it intercepts the target. Resistor 32 in series with condenser 29 in the normal position is of a large value and prevents rapid erratic fluctuations of error signal from changing the charge of condenser 29. Resistor 32 thus acts to make the charge of condenser 29 a sort of weighted average of twice the error input over a short period of time prior to the time the radar homing bomb tracking device becomes inoperative.

The invention described in the foregoing specification need not be limited to the details shown, which are considered illustrative of one form the invention may take.

What is claimed is:

1. A control circuit comprising a differential amplifier, including first and second electron tubes each having at least a cathode, a plate, and a control grid, first and second plate load resistances, a condenser connected between the plate load resistances of said differential amplifier, the location of said condenser connections on said plate load resistances causing a charge to be placed on said condenser proportional to the error signal input to said differential amplifier, and switching means, said switching means adapted to connect said condenser between the grids of said differential amplifier when the input signal has ceased, the voltage applied by said condenser causing the output of said differential amplifier to be altered in the same proportion as that existing between said error signal and said charge on said condenser at the time of operation of said switching means.

2. In electronic control apparatus, a device for extrapolating control over periods when error information is not obtained comprising, a differential amplifier, said differential amplifier including first and second electron tubes, each having at least a cathode, a plate, and a control grid, a common cathode resistance, the cathodes of said first and second electron tubes connected through said common cathode resistance to a source of negative voltage, first and second plate load resistors, a source of positive voltage, the plate of said first electron tube connected through said first plate load resistor, to said source of positive voltage, the plate of said second electron tube connected through said second plate load resistance to said source of positive voltage, the control grids of said first and second electron tubes normally connected to a differential voltage source, a condenser, a large resistance, said condenser and said large resistance normally connected in series between said first plate load resistance and said second plate load resistance, the location of said connections on said first and second plate load resistances causing a charge to be placed on said condenser proportional to the differential voltage source applied to said control grids, said large resistance preventing rapid erratic fluctuations of said differential voltage source from changing said charge on said condenser, and switching relay means, said switching relay means connecting said condenser between said control grids of said first and second electron tubes during periods when the input signal from said differential voltage source has ceased, the voltage applied by said condenser causing said differential amplifier to continue functioning during said periods of no error information, the differential voltage output at the plates of first and second electron tubes being altered in the same proportion as that existing between said differential voltage and said charge on said condenser at the time of operation of said switching relay means.

References Cited in the file of this patent

UNITED STATES PATENTS

| | | |
|---|---|---|
| 2,059,081 | Beers | Oct. 27, 1936 |
| 2,243,118 | Peterson | May 27, 1941 |
| 2,393,921 | Mason | Jan. 29, 1946 |
| 2,422,334 | Bedford | June 17, 1947 |
| 2,516,356 | Tull et al. | July 25, 1950 |